(12) United States Patent
Connelly (10) Patent No.: US 7,668,534 B2
(45) Date of Patent: Feb. 23, 2010

(54) METHOD AND SYSTEM FOR TRANSPORTATION OF DERIVED CALL RECORDS TO A CENTRAL REPOSITORY

(75) Inventor: Stephen Philip Connelly, Reston, VA (US)

(73) Assignee: Agilent Technologies, Inc., Santa Clara, CA (US)

( * ) Notice: Subject to any disclaimer, the term of this patent is extended or adjusted under 35 U.S.C. 154(b) by 519 days.

(21) Appl. No.: 11/172,933

(22) Filed: Jul. 5, 2005

(65) Prior Publication Data

US 2007/0010239 A1 Jan. 11, 2007

(51) Int. Cl.
*G06F 15/16* (2006.01)
(52) U.S. Cl. .................... 455/412.1; 455/423
(58) Field of Classification Search ........... 455/412, 455/423; 379/115, 133; 375/240; 705/38
See application file for complete search history.

(56) References Cited

U.S. PATENT DOCUMENTS

| | | | |
|---|---|---|---|
| 5,909,545 A * | 6/1999 | Frese et al. ............... 709/208 |
| 5,912,954 A | 6/1999 | Whited et al. |
| 5,999,604 A * | 12/1999 | Walter ..................... 379/133 |
| 6,275,537 B1 * | 8/2001 | Lee ....................... 375/240.28 |
| 6,327,350 B1 * | 12/2001 | Spangler et al. ........ 379/115.01 |
| 6,873,617 B1 | 3/2005 | Karras |
| 7,330,460 B1 * | 2/2008 | Hagirahim et al. .......... 370/352 |
| 2003/0069816 A1 | 4/2003 | Ung et al. |
| 2004/0088244 A1 * | 5/2004 | Bartter et al. ................. 705/38 |
| 2007/0174428 A1 * | 7/2007 | Ran et al. ................... 709/218 |

FOREIGN PATENT DOCUMENTS

WO    WO 0120920 A1    3/2001

\* cited by examiner

*Primary Examiner*—Sam Bhattacharya (57) ABSTRACT

A method of monitoring, and a system to perform the method of monitoring, a mobile network, the method including receiving a data stream from one or more monitoring points of the mobile network and generating a detail record of an information transaction in the mobile network, storing the generated detail record in a data record storage unit immediately upon completion of the information transaction, and notifying a user that the detail record is available to be viewed.

21 Claims, 5 Drawing Sheets

Signaling Analyzer Monitor - Post Capture - SA_2005-02-17_21-39-25_UpGrade.sal

File  Edit  View  Tools  Record  Call Trace  Window  Help

SA_2005-02017_21-39-25_UpGrade.sal:2 Call Trace: 3GPPR99 12-2002 ro 12-2003 Iu Interface

| Call Id | Duration | Status | Start Ti... | IMSI | IMEI | Oldest TMS... | Latest TMS... | SAI-L | SAI-S | RAC | Called Part | Called Part | Service Type | Du | S |
|---|---|---|---|---|---|---|---|---|---|---|---|---|---|---|---|
| 0 | 3.02 | ▮ | 15:38:37 | | | 031C149C | 031C149C | 6128 | 2316 | | | | Location Update | CS | E |
| 1 | 3.78 | ▮ | 15:38:40 | | | 0E59C649 | 0E59C649 | 612a | 9184 | | | | Location Update | CS | E |
| 2 | 0.67 | ▮ | 15:38:46 | | | 2811F558 | 2811F558 | 6126 | 576c | | | | Routing Area Upd | PS | E |
| 3 | 2.63 | ▮ | 15:38:48 | | | 031C1591 | 031C1591 | 6128 | 2316 | | | | Location Update | CS | E |
| 4 | 3.25 | ▮ | 15:38:48 | 262019439069462 | | 0568809C | 28121760 | 6128 | 2316 | 01 | | | Routing Area Upd | PS | E |
| 5 | 1.77 | ▮ | 15:38:51 | 262012800207402 | | 3A121766 | 3A121766 | 612a | 07b0 | 01 | | | PDP Context | PS | E |
| 6 | 3.99 | ▮ | 15:38:51 | | | 73B17F2D | 73B17F2D | 612a | 4dba | | | | Location Update | CS | E |
| 7 | 1.67 | ▮ | 15:38:55 | 262014730068770 | | 3A111538 | 3A111538 | 6128 | 79b5 | 01 | | | PDP Context | PS | E |
| 8 | 1.75 | ▮ | 15:39:02 | 262012800207402 | | 3A121766 | 3A121766 | 612a | 07b0 | 01 | | | PDP Context | PS | E |
| 9 | 4.11 | ▮ | 15:39:04 | | | 3F821E93 | 3F821E93 | 6128 | 2696 | | | | Location Update | CS | E |
| 10 | 3.40 | ▮ | 15:39:08 | | | 3F821F2E | 3F821F2E | 6128 | d2a7 | | | | Location Update | CS | E |
| 11 | 2.30 | ▮ | 15:39:08 | 262015710086017 | | 0993304D | 1A0218C0 | 6128 | d2a7 | 01 | | | Routing Area Upd | PS | E |
| 12 | 3.39 | ▮ | 15:39:14 | | | 3F821810 | 3F821810 | 6128 | 8f1a | | | | Location Update | CS | E |
| 13 | 1:50:59 | ▮ | 15:39:16 | 262014110117579 | | 8F5088E8 | 8F5088E8 | 612a | 0abd | | | | Paging Response | CS | E |
| 14 | 43.00 | ▮ | 15:39:17 | 262015830078781 | | 380116DD | 380116DD | 6126 | 2a91 | 01 | | | PDP Context | PS | E |
| 15 | 0.64 | ▮ | 15:39:17 | | | 3A1214D1 | 3A1214D1 | 6128 | 4bec | 01 | | | Routing Area Upd | PS | E |
| 16 | 3.75 | ▮ | 15:39:19 | | | 3F82208D | 3F82208D | 6128 | 8df6 | | | | Location Update | CS | E |
| 17 | 1.71 | ▮ | 15:39:22 | 262012800207402 | | 3A121766 | 3A121766 | 612a | 07b0 | 01 | | | PDP Context | PS | E |

200

| Call Id | Duration | Status | Start Ti... | Establish Cau... | IMSI | IMEI | Oldest TMS... | Latest TMS... | Node B Comm | CRNC Comm | S-RNT | SRNC Identity | LAC |
|---|---|---|---|---|---|---|---|---|---|---|---|---|---|
| 0 | 2.70 | ▮ | 15:38:39 | InterRat-Cell Res... | | | 0e55c649 | 8f513121 | 601/6924 | 601/6924 | 00009b8d | 003d | 612 |
| 1 | 0.00 | | 15:38:37 | | | | | | | 6945 | | | |
| 2 | 2.12 | ▮ | 15:38:50 | InterRat-Cell Res... | | | 73b17f2d | 8f5132ac | 6843 | 6843 | 000041c8 | 003d | 612 |
| 3 | 0.00 | | 15:38:40 | | | | | | | 6978 | | | |
| 4 | 0.84 | ▯ | 15:38:54 | Originating HighPr... | | | 8f464adc | 3a11153b | 632 | 632 | 00009b8a | 003d | 612 |
| 5 | 1.06 | ▮ | 15:38:59 | InterRat-Cell Res... | | | 8f5131f8 | dcaa66d7 | 2389 | 2389 | 000045da | 002e | 612 |
| 6 | 2.86 | ▮ | 15:39:03 | InterRat-Cell Res... | | | 3f821e93 | 8f51343d | 6956/587 | 6956/587 | 000041f7 | 003d | 612 |
| 7 | 2.38 | ▮ | 15:39:07 | InterRat-Cell Res... | | | 3f821f2e | 8f5134d4 | 6964 | 6964 | 000041t5 | 003d | 612 |
| 8 | 11.44 | ▮ | 15:39:12 | Registration | | | a4610294 | 3b0050a2 | 2373 | 2373 | 000045d0 | 002e | 612 |
| 9 | 0.07 | ▮ | 15:39:17 | Registration | | | 8f5103e0 | 3a1214d1 | 547 | 547 | 00009b85 | 003d | 612 |
| 10 | 16.72 | ▮ | 15:39:16 | Originating HighPr... | | | 8f51253f | 8f51253f | 6943/626 | 6943/626 | 000041t3 | 003d | 612 |
| 11 | 0.00 | | 15:39:20 | | | | | | | 523 | | | |
| 12 | 0.00 | | 15:39:24 | | | | | | | 9424 | | | |
| 13 | 0.00 | | 15:39:25 | | | | | | | 6984 | | | |
| 14 | 0.00 | | 15:39:19 | | | | | | | 1945 | | | |
| 15 | 1.53 | ▮ | 15:39:31 | Originating HighPr... | | | 8f512777 | 8f512777 | 6965 | 6965 | 000041f1 | 003d | 612 |
| 16 | 1.95 | ▮ | 15:39:32 | InterRat-Cell Res... | | | 73b16fb2 | 8f513772 | 6870 | 6870 | 000041bf | 003d | 612 |

METHOD AND SYSTEM FOR TRANSPORTATION OF DERIVED CALL RECORDS TO A CENTRAL REPOSITORY

BACKGROUND OF THE INVENTION

Telecommunications networks, such as wireless, wireline and data communication networks, are widely used to link various types of nodes, such as personal computers, servers, gateways, network telephones, and so forth. Networks may include private networks, such as local area networks (LANs) and wide area networks (WAN), and public networks, such as the Internet. Such networks can also be circuit-switched networks in which network resources are dedicated for the entire duration of a data call, and/or packet-switch networks, such as Internet Protocol (IP) networks in which network resources are shared and data in the form of packets or cells are routed independently across the networks along with other user traffic to a destination. Examples of packet-switched networks include Asynchronous Transfer Mode (ATM) networks, Ethernet or Frame Relay, which are based on a virtual circuit model. Popular forms of communications across such networks include electronic mail, file transfer, web browsing, and other exchange of digital data including audio (e.g., voice) and multimedia (e.g., audio and video).

Modern telecommunications networks typically include two related but separate network infrastructures: a bearer or transmission network for carrying end-user voice and data traffic, and a signaling network for controlling the setup and release of bearer channels through the bearer network in accordance with control signals transferred through the signaling network. In practice, such signaling networks comprise high-speed computers interconnected by signaling links, and computer programs implemented to provide a set of operational and signaling functions in accordance with a standardized protocol, such as, for example, the Signalling System No. 7 (SS7) which is being extensively deployed for control of mobile telephony and other data transmission networks. The signaling links are used for passing signaling information (e.g., messages) between nodes in the signaling networks. The signaling information (e.g., messages) can be captured to generate detail records, such as, Call Detail Records (CDRs) or Transaction Detail Records (TDRs) for storage in a database system which can be subsequently monitored and analyzed for a wide variety of applications, including, for example, quality of service applications and business intelligence applications. In addition to the detail records, other related information sent between nodes, switches or devices in such mobile networks can also be used for authentication, equipment identification and roaming enablement.

Commercially available tools for mobile telephony networks may be used for monitoring the performance (or quality) of a network based on the detail records stored in the database system to observe possible obstacles and track performance statistics in the network. Typically, such monitoring tools are based on monitoring the network for malfunctions at the level of network elements, such as switches or interfaces, for traffic-related information. However, such actions will result in the collection of vast amounts of data, which makes it difficult and time consuming for an end user attempting to identify problems in the network and perform analysis of the collected data. Further, the detail records, such as Call Detail Records (CDRs), are traditionally saved to a file or stored in memory for later transport to an analysis system, the transport being an automated process that takes place during a certain period or periods in a day. In other words, the CDRs are conventionally held in the monitoring system until a point in time in which the CDRs are deposited en masse into a CDR storage area. This makes it difficult for a user who wishes to monitor and analyze the mobile telephony network in real time, as the user has to wait for the CDRs to be deposited into the storage area, rather than having immediate access to the CDRs so that they may be analyzed in real time.

Accordingly, there is a need for improved tools, systems and methods for the management and analysis of detail records in such networks, including the ability to store the CDRs in a CDR storage area soon after a completion of a call, and to provide a user with a way to view the CDRs in real time.

SUMMARY OF THE INVENTION

Various aspects and example embodiments of the present invention advantageously provide tools, systems and methods for the management and analysis of detail records in a mobile telephony network, including storing detail records and providing the detail records for analysis, in real time. The detail records may then be analyzed by a user upon completion of the respective calls, rather than waiting for the detail records to be saved in a storage area at a later time.

According to one aspect of the present invention, a system is provided to monitor a mobile network, comprising a data record generator arranged to receive, on a real-time basis, a data stream representing calls occurring on the mobile network, and to generate a call detail record (CDR) corresponding of a single call; and an encapsulator/decapsulator unit arranged to encapsulate the CDR in a network transport protocol immediately when the single call is terminated, and transport the same to a CDR repository for storage and/or immediate action by a user, via a user input.

The encapsulator/decapsulator unit may be provided with an encoder which receives and decodes the CDR according to predefined encoding rules, when the single call is terminated; a transporter which encapsulates an encoded CDR in packet form and generates a stream of packets using the network transport protocol; a decoder which decodes the packets using predefined decoding rules to obtain the original CDR; and a CDR gateway which serves as a gateway for forwarding the CDR to a storage engine where the CDR can be stored in a CDR Repository, and/or a notification engine where immediate user notifications can be generated in real-time, in response to predefined notification rules by way of email notification, pager, text messaging, Simple Network Management Protocol (SNMP) trap, or any combination thereof.

The user input corresponds to a graphical user interface (GUI) which accepts inputs from the user to set the user defined call criteria for retrieval of one or more CDRs associated with a particular call from the CDR repository for initial signaling analysis and to request retrieval of detailed frame messages corresponding to one or more selected CDRs for detailed signaling analysis.

The encapsulator/decapsulator unit may also be configured to retrieve one or more CDRs from the CDR repository associated with a particular call ID for a visual display, upon request from the user input, and to receive a request from the user input to perform a "drill-down" operation in which one or more CDRs that make up the selected call can be drilled down for signaling analysis, or details of individual frames corresponding to selected CDRs that make up the selected call can be drilled down for a visual display for detailed signaling analysis.

The user input may comprise a graphical user interface, and the user may determine a method in which the notification unit notifies the user that the detail record is available to be viewed.

According to another aspect of the invention, a method of monitoring a mobile network comprises receiving a data stream from one or more monitoring points of the mobile network and generating a detail record of a single call occurring on the mobile network; encapsulating the detail record in a network transport protocol immediately when the single call is terminated; and transporting an encapsulating detail record to be stored in a central repository for storage and/or immediate action by a user, via a user input.

According to another aspect of the present invention, a computer readable medium encoded with processing instructions to perform a method of monitoring a mobile network is provided, the method comprising receiving a data stream from one or more monitoring points of the mobile network and generating a detail record of a single call occurring on the mobile network; encapsulating the detail record in a network transport protocol immediately when the single call is terminated; and transporting an encapsulating detail record to be stored in a central repository for storage and/or immediate action by a user, via a user input.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIGS. 2A-2B illustrate example CDRs obtained from example monitor points that may be correlated and aggregated according to various embodiments of the present invention;

DETAILED DESCRIPTION OF THE EMBODIMENTS

Before beginning a detailed description of the subject invention, mention of the following is in order. When appropriate, like reference numerals and characters may be used to designate identical, corresponding or similar components in differing figure drawings. Further, in the detailed description to follow, example sizes/values/ranges may be given, although the present invention is not limited to the same. The present invention is also applicable for use with all types of telecommunication networks, including, for example, an Integrated Systems Digital Network (ISDN), a Voice over IP (VoIP) network, the Internet, or mobile telephony networks (e.g., based on Telecommunications Industry Association (TIA)/Electronics Industries Alliances (EIA) standards, such as IS-95, IS-856 or IS-2000), such as a Time Division Multiple Access (TDMA) network, a Code Division Multiple Access (CDMA) network, a Wideband Code Division Multiple Access (W-CDMA) network, a Global System for Mobile communication (GSM) network, a General Packet Radio Service (GPRS) network, or a Universal Mobile Telecommunications System (UMTS) network, and the next generation of wireless networks which may become available as technology develops, including CDMA technologies for wireless data services and applications, such as wireless email, web, digital picture taking/sending and assisted-GPS position location applications, and compatible network protocols, such as hyper text transfer protocols (HTTP), file transfer protocols (FTP), VoIP protocols, and UMTS protocols as defined by 3GPP group (see http://www.3gpp.org). However, for the sake of simplicity, discussions will concentrate mainly on exemplary use of an UMTS mobile network, although the scope of the present invention is not limited thereto.

Figure 1:
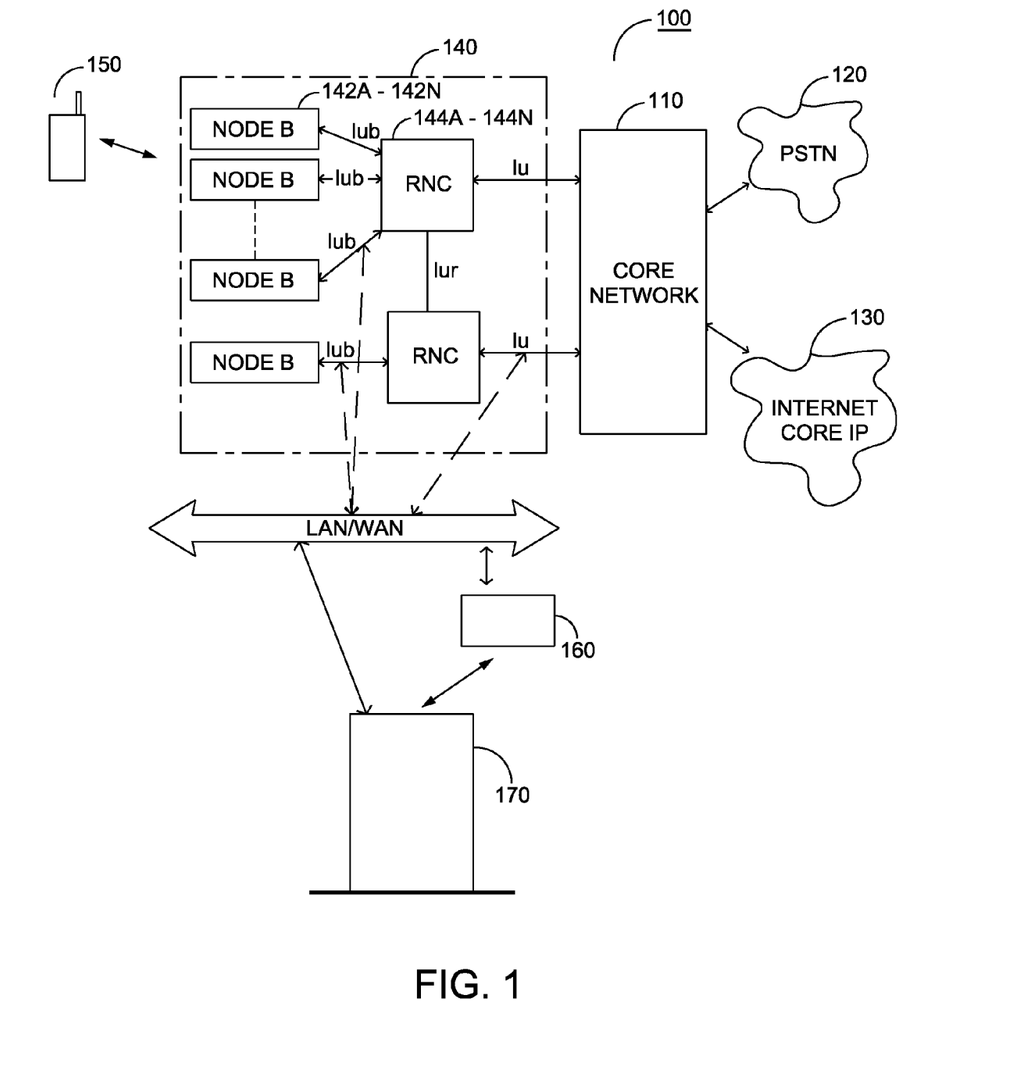
FIG. 1 illustrates an example mobile telephony network and monitoring systems used for signaling analysis of the mobile telephony network.

Attention now is directed to the drawings and particularly to FIG. 1, in which an example a mobile telephony network, such as an universal mobile telecommunications system (UMTS) network is illustrated. As shown in FIG. 1, the mobile telephony network 100 includes a core network 110 which supports circuit-switched networks such as a public switch telephone network (PSTN) 120, and/or packet-switched networks such as Internet Core IP 130; a radio access network 140 connected to the core network 110 to support communications with a user equipment (UE) 150 which is typically a mobile phone, a video phone or a personal digital assistant (PDA). Typically, the core network 110 contains a mobile switching center (MSC) (not shown) supporting communications, via the circuit switched networks such as PSTN 120, and one or more support nodes (not shown) providing a gateway to the packet-switched networks such as Internet core IP 130 and controlling the connection between the network and the user equipment (UE) 150 for wireless communications. The radio access network 140 includes one or more nodes "B", also known as base stations, 142A-142N, and one or more radio network controllers (RNCs) 142A-142N connected to the localized group of nodes 142A-142N to select the most appropriate node for the user equipment (UE) 150 and perform handover during wireless communications, when necessary. Network architecture and implementation of the UMTS network 100, including backbone ATM switches, interfaces such as "lu" disposed between the RNCs 144A-144N and the core network 110, "lur" disposed between the RNCs 144A-144N, "lub" disposed between the RNCs 144A-144N and the corresponding nodes 142A-142N, signaling links between nodes and network elements within the UMTS network 100, and signaling information passing between the signaling links are well-known and, as a result, need not be described in detail herein. However, for purposes of brevity, the signaling information represents data regarding the establishment, control and management of functions of the network 100. Detail records, such as, Call Detail Records (CDRs) of a specific call or Transaction Detail Records (TDRs) of a specific data session can be constructed from signaling information transmitted between signaling links within the mobile telephony network 100. The terms "CDR" and "TDR" may be seen interchangeable in the context of a mobile telephony network 100 disclosed herein. Similarly, the terms "call" and "data session" can also be used interchangeably, and can be broadly described simply as "transaction".

Typically, CDRs may have different structures or formats in the telecommunication industry each containing different types of information depending on what the CDRs will be used for, including, for example, defining telephone calls originating on land-line telephones, telephone calls terminating on land-line telephones and telephone calls terminating on mobile telephones. However, for purposes of simplicity, CDRs as referred herein shall represent generic CDRs. The term "CDR" refers generally to any electronic record of the details of a call, including, for example, originating number, terminating number, time, duration etc. Specifically, each CDR may correspond to a collection of messages comprising parameters and time-stamps associated with each call which provide detail regarding the call origin, destination, and other details. The parameters and time-stamps associated with each message or collection of information referred to as the "CDR" are the primary pieces of information needed to determine who called whom, how the call was routed and the call disposition for signaling analysis. These CDRs can be monitored and analyzed for a wide variety of applications, including, for example, quality of service applications and business intelligence applications, such as service assurance, fraud detection, fulfillment and billing applications.

As shown in FIG. 1, a monitoring system 160 can be configured to capture traffic, including signaling data, on key interfaces, including, for example, "Iub" interfaces and "Iu" interfaces, or other signaling links, within the mobile telephony network 100 for signaling analysis of the mobile telephony network 100. Such a monitoring system 160 can be coupled to interfaces, such as "Iub" interfaces connecting one of the RNCs 144A-144N to at least one node 142A-142N, or "Iu" interfaces connecting the RNCs 144A-144N to the core network 110, or ATM switches, either directly, or via a local or wide area network (LAN/WAN), to capture signaling data at a particular interface or signaling link and provide captured signaling data for analysis or collection by a computer (database) system 170. The monitoring system 160 may be, for example, AGILENT™ G6801A Distributed Network Analyzer (DNA) used for capturing all signaling data from a particular signaling link (i.e., interface within the mobile telephony network 100) that relates to a single call or data session, for example, and for controlling the distribution of the signaling data for real-time network testing and analysis, including diagnostics of quality of services and troubleshooting. In addition, software applications, such as AGILENT™ J7326A Signaling Analyzer software (SAS), can be also be installed on the computer system 170, which can be an independent server or host computer system, to decode and analyze captured signaling data locally, with a real-time display. The SAS can also be stored on the monitoring system 160 or any computing system, such as an external PC, a laptop, or a server coupled to a local area network (LAN). The captured signaling data can represent a large number of calls/sessions and can be visually displayed, via a user-configurable window or table format, so that a user (i.e., network administrator or maintenance personnel) can trace each call that has occurred or is occurring on the mobile telephony network 100.

Typically, the monitoring system 160 creates Detail Records, such as CDRs, which are assembled by piecing together individual frames of incoming data stream that are being transported across the mobile telephony network 100. These CDRs can then be saved for later signaling analysis, potentially leaving a long time before signaling analysis can be realized and remedial actions can be taken in response to the signaling analysis. However, when viewing calls within the monitoring system 160 and/or the computer system 170 after waiting for the CDRs to be stored for analysis, the user (i.e., network administrator or maintenance personnel) is generally unable to take immediate corrective action when problems occur in the mobile telephony network 100. In addition, the user (i.e., network administrator or maintenance personnel) can also be overwhelmed with the deluge of calls that can take place within the mobile telephony network 100.

Figure 2B:
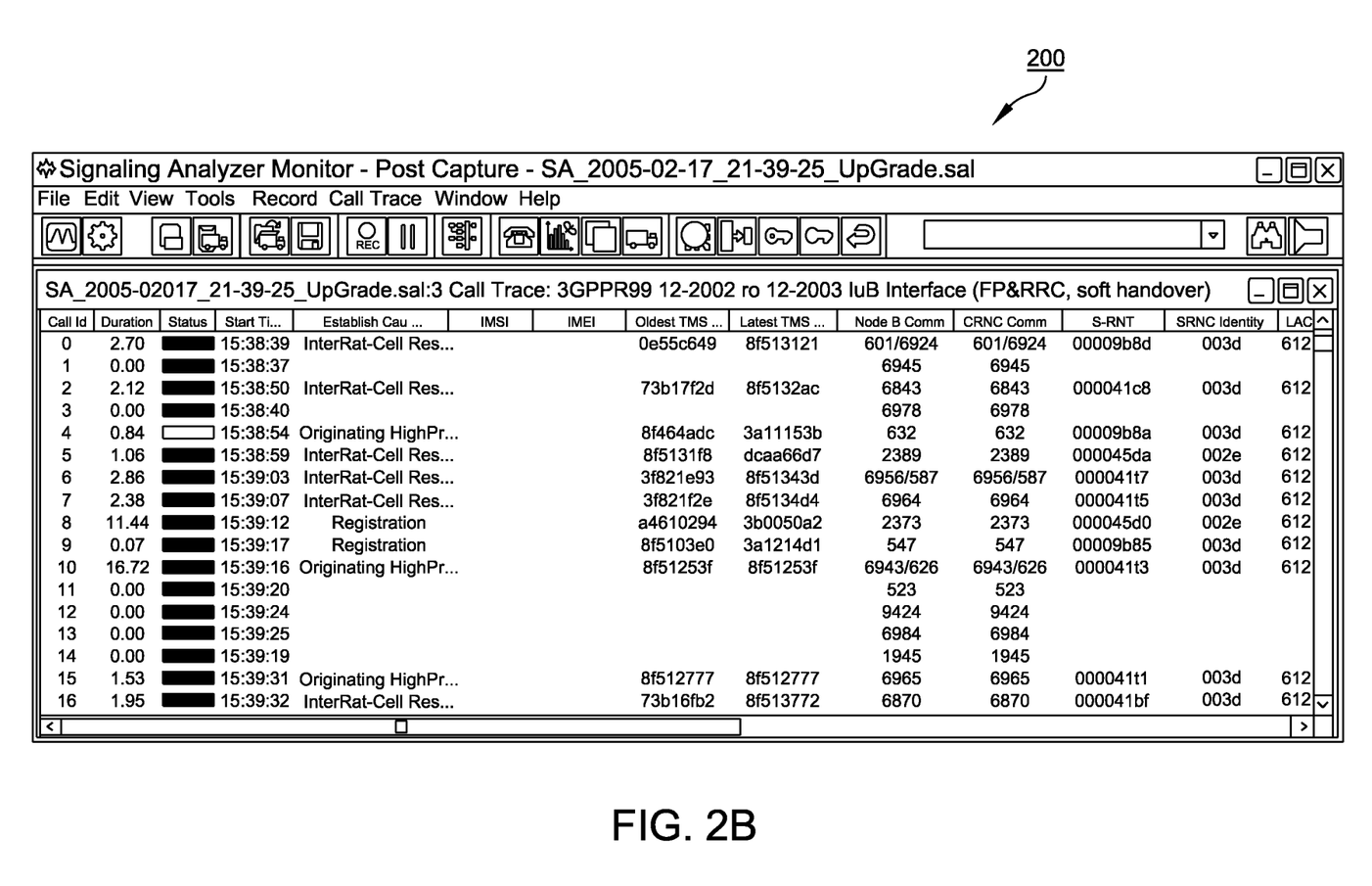

For example, FIGS. 2A-2B illustrate a visual display of different types of Call Detail Records (CDRs) obtained from different signaling links (monitor points, such as interfaces or switches) in the mobile telephone network 100 on a computer system 170. Specifically, FIG. 2A illustrates a visual display of example CDRs obtained from an "Iu" interface disposed between the RNCs 144A-144N of the radio access network (RAN) 140 and the core network 110 of the mobile telephony network 100. Alternatively, FIG. 2B illustrates a visual display of example CDRs obtained from an "Iub" interface disposed between the RNCs 144A-144N and the corresponding nodes 142A-142N of the radio access network (RAN) 140 of the mobile telephony network 100.

As shown in FIG. 2A and FIG. 2B, each row in the display on the database system 170 represents a call that has occurred or is occurring on the mobile telephony network 100. Each column contains parameters that are particular for a specific trace which may indicate specific problems. The parameters utilized for an "Iu" interface, as shown in FIG. 2A, may include, for example, Call ID, Duration, Status, Start Time, Establishment Cause, IMSI, IMEI, Oldest TMSI/P-TMSI, Latest TMSI/P-TMSI, SAI LAC, SAT SAC, RAC, Called Party BCD Number, Calling Party BCD Number, Service Type, Domain, SCCP Release Cause, RANAP Cause, Setup Time, Cleardown Time, Speech Path/CID, Bad Speech Frames, IPv4 Address, Uplink Packets, Downlink Packets, Uplink Octets, Downlink Octets, Uplink Rate bps, and Downlink Rate bps. Similarly, the parameters utilized for an "Iub" interface, as shown in FIG. 2B, may include, for example, Call ID, Duration, Status, Start Time, Establishment Cause, IMSI, IMEI, Oldest TMSI/P-TMSI, Latest TMSI/P-TMSI, Node B CommCtx ID, CRNC CommCtx ID, S-RNTI, SRNC Identity, LAC, RAC, Cell Identifier, Service Type, Domain, SCCP Release Cause, RANAP Cause, Setup Time, Cleardown Time, Speech Path/CID, Bad Speech Frames, IPv4 Address, Uplink Packets, Downlink Packets, Uplink Octets, Downlink Octets, Uplink Rate bps, and Downlink Rate bps.

"Call ID" may represent a unique identifier of a specific call; "Duration" may represent a duration of the completed call; "Status" may represent whether a call is active or terminated. "Start Time" may represent the start time of the call; "IMSI" may represent an International Mobile Subscriber Identity of a subscriber initiating the call; "IMEI" may represent an International Mobile Equipment identify of equipment manufacturers; "Oldest TMSI/P-TMSI" may represent a Temporary Mobile Subscriber Identity (TMSI) and the packet TMS; "Latest TMSI/P-TMSI" may represent the latest TMSI and the packet TMSI; "SAI LAC" may represent a Service Area Identifier of the Location Area Code; "SAI SAC" may represent a Service Area Identifier of the Routing Area Code; "Called Party BCD Number" may represent a Called Party Binary Coded Decimal Number; "Calling Party BCD Number" may represent a Calling Party Binary Coded Decimal Number; "Node B CommCtx ID" may represent an identifier of the Communication Context in the Node B;

"CRNC CommCtx ID" may represent an identifier of the Communication Context of the Node B in the Radio Network Controller (RNC); "S-RNTI" may represent a serving Radio Network Temporary Identity; "SRNC Identity" may represent a serving Radio Network Controller Identity; "LAC" may represent a Location Area Code which identifies a location area within the mobile network 100; "RAC" may represent a Routing Area Code within a location area; "Cell Identifier" may represent an identifier of a cell in one Radio Network Controller (RNC); "Service Type" may represent a type of service that occurred during the duration of a call; "Domain" may represent a type of network in which a call is transmitted: Circuit Switched (CS) or Packet Switched (PS); "Release Cause" may represent a criteria for the call to be released; "RANAP Cause" may represent text description of a cause; "Setup Time" may represent a time taken to set up a call or session; "Cleardown Time" may represent a time taken to clear down a call or session; "Speech Path/CID" may represent VCI/CID that is used for the call; "Bad Speech Frames" may represent a count of the number of bad speech frames that were detected during a call which indicates the level of quality of voice calls during a call; "IPv4 Address" may represent the Internet Protocol Version #4 address; "Uplink Packets" may represent a count of the number of IP packets that the user equipment (UE) has sent to the mobile network 100 during a data session; "Downlink Packets" may represent a count of the number of IP packets that the user equipment (UE) 110 has received from the mobile network 100 during a data session; "Uplink Octets" may represent the count of the number of IP octets that the user equipment (UE) 110 has sent to the mobile network 100 during a data session; "Downlink Octets" may represent a count of the number of IP packets that the user equipment (UE) has received from the mobile network 100 during a data session; "Uplink Rate bp/s" may represent the average data transfer rate in bits/second that the user equipment (UE) 110 has experienced while sending data to the mobile network 100; and "Downlink Rate bp/s" may represent an average data transfer rate in bits/second that the user equipment (UE) 110 has experienced while receiving data from the mobile network 100.

As can be seen from FIGS. 2A-2B, calls and call ID variables obtained from different signaling links (i.e., interfaces) in the mobile telephony network 100 can be different; nevertheless, these calls may have common characteristics such as: Call Type; Start Time; End Time; Successful; or Failure Reason, all of which (whether from one or more signaling links) can be analyzed to identify and pinpoint problems in the mobile telephony network 100. Nevertheless, the user has to sift through the high volume of calls being transported on the mobile telephony network 100 and then wait potentially a long time before captured data of terminated calls can be saved and subsequently analyzed. As a result, such a review, via the monitoring system 160 and/or the computer system 170 can be overwhelming, whether the calls obtained are from a single signaling link or different signaling links. Moreover, when viewing calls within the monitoring system 160 and/or the computer system 170 after waiting for the CDRs to be stored for analysis, the user (i.e., network administrator or maintenance personnel) is unable to take immediate corrective action when problems occur in the mobile telephony network 100. Therefore, it is important to provide a user (i.e., a network administrator or maintenance personnel) with improved tools, systems and methods for the management and analysis of detail records in such a mobile telephony network 100, including the ability to monitor all calls occurring in the mobile telephony network 100 in real time, and the ability to encapsulate or package CDR(s) of a specific call or data session in a transport protocol immediately when such a call is terminated for transportation to a storage engine for a central repository or a notification engine for immediate notification so that potential problems can be immediately identified and addressed.

Figure 3:
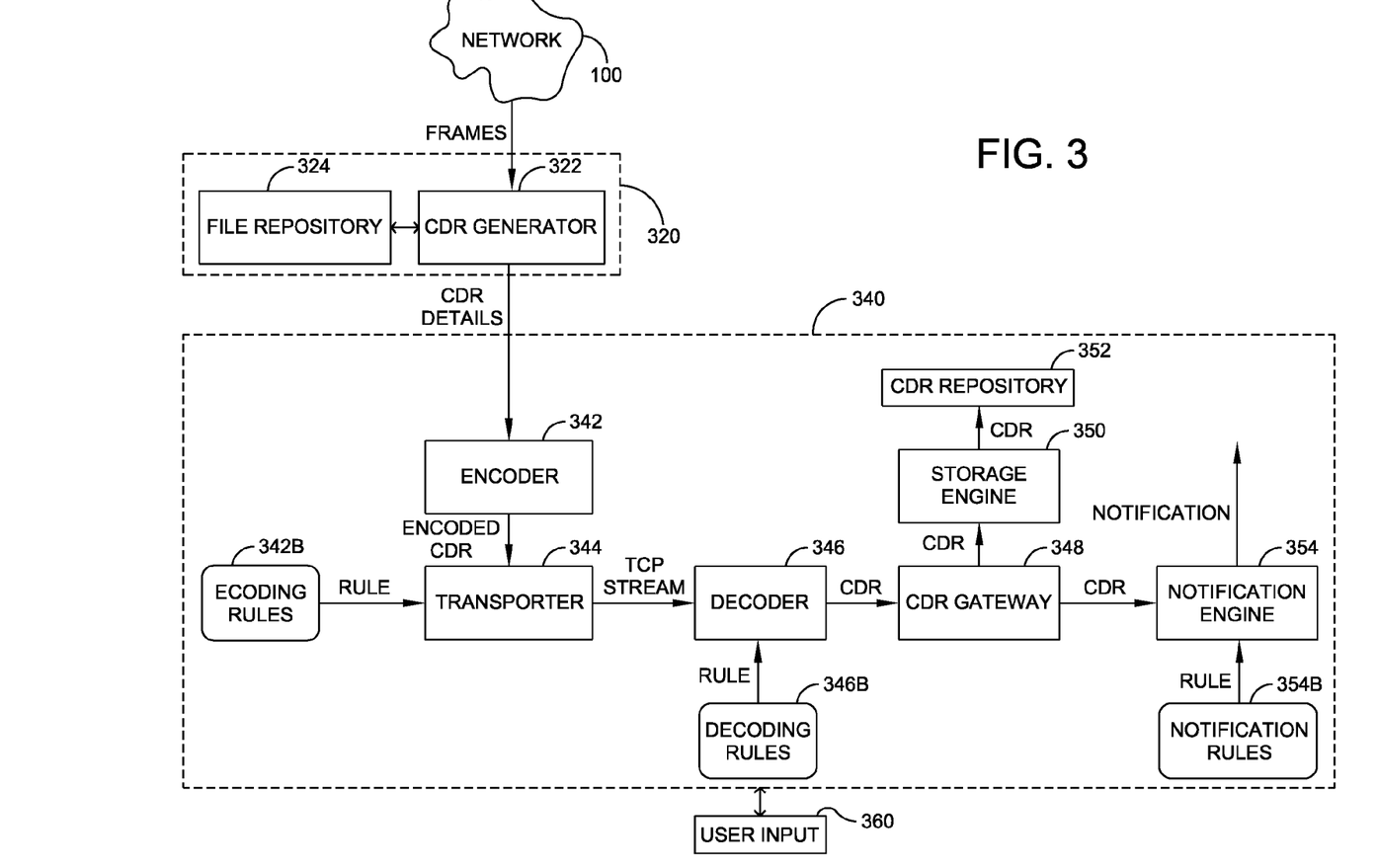
FIG. 3 illustrates an example data record package and transportation system according to an embodiment of the present invention.

Turning now to FIG. 3, an example of a data record package and transportation system 300 according to an embodiment of the present invention is illustrated. As shown in FIG. 3, the system 300 comprises a CDR Production unit 320 which receives an incoming data stream made of individual frames (messages) that make up each call from a signaling link (i.e., interface or switch) within a mobile telephony network 100, and, upon receipt of the incoming data stream, stores individual frames of raw data in data files (e.g., SAL files) provided with a file directory, and then generates CDRs corresponding to the calls that are being transported across the mobile telephony network 100; a CDR Encapsulator/Decapsulator unit 340 which manages the encapsulation/decapsulation of one or more CDRs in a network transport protocol immediately when a call is terminated for transportation to a CDRI repository for problem analysis or immediate action, and also manages the storage and retrieval of CDRs to/from the CDR repository, and individual frames of corresponding CDRs stored at the CDR Production unit 310, including selecting a specific type of calls that are of interest and executing a "drill-down" operation in which details of individual frames that make up the selected call can be drilled down from the CDR Production unit 320 upon request by a user (i.e., network administrator or maintenance personnel); and a user input 360 which enables the user, upon notification of terminated calls, to review calls transported on the mobile telephony network 100, to make selection regarding the type of calls that are of interest for retrieval of all CDRs associated with the selected call for signaling analysis, and to request for execution of the "drill-down" operation in which one or more selected CDRs can be retrieved for a visual display for signal analysis, or alternatively, detailed frame messages corresponding to one or more selected CDRs can be retrieved for a visual display for detailed signal analysis. In contrast to normal signal analysis, a detailed signal analysis may include, for example, a report of a time based sequence of events that can be inspected for potential errors at specific times, a confirmation of the CDR to ensure its accuracy, and a report of individual common measurements (which are messages sent every N seconds, to indicate signal characteristics such as signal strength) that can be inspected for signal characteristics. This type of detailed signal analysis can only be completed based on raw frame messages, and not based on the CDRs.

Referring back to FIG. 3, the CDR production unit 320 includes a CDR Generator 322 and an internal database, known as a File Repository 324. The CDR Generator 322 is arranged to receive an incoming data stream made up of individual frames (messages) which represent calls that have occurred or are occurring on the telephony network 100, to package individual frames or messages that make up each call in a separate and discrete data file, known as SAL files, to store packaged data files in the File Repository 324, and then generate data records such as CDRs corresponding the calls that have occurred or are occurring on the telephony network 100.

The CDR Encapsulator/Decapsulator unit 340 includes an Encoder 342 which receives CDRs from the CDR Generator 322 when a call is terminated, and encodes the CDRs in accordance with predefined encoding rules 342B; a Transporter 344 which encapsulates encoded CDRs in terms of packets and generates a stream of packets using a network transport protocol (i.e., call flow protocol) in common use in multiple networks, such as Transmission Control Protocol (TCP); a Decoder 346 which decodes the TCP packets using predefined decoding rules 346B to obtain the CDRs; a CDR Gateway 348 which serves as a gateway for forwarding the CDRs to a Storage Engine 350 where the CDRs can be stored in a CDR Repository 352, and/or a Notification Engine 254 where immediate user notifications can be generated in real-time, in response to predefined notification rules 352B, for example, by way of email notification, pager, text messaging, Simple Network Management Protocol (SNMP) trap, or any combination thereof.

Separately, the CDR Encapsulator/Decapsulator unit 340 can also be configured to receive and store the CDRs in the CDR Repository 352, and to retrieve one or more CDRs from the CDR Repository 352 associated with a particular call ID (e.g., IMSI) for a visual display, upon request from the user input 360, and to receive a request from the user input 360 to perform a "drill-down" operation in which one or more CDRs that make up the selected call can be drilled down from the CDR Repository 352 for signaling analysis, or details of individual frames corresponding to selected CDRs stored in the File Repository 314 that make up the selected call can be drilled down from the File Repository 314 for a visual display at the user input for detailed signaling analysis. The user input 360 can be an intuitive graphical user interface (GUI) to facilitate clarity and easiness of use for user.

Such a CDR Encapsulator/Decapsulator unit 340 can also be implemented as a control unit, such as a microprocessor, a microcontroller, or a processor card installed, for example, in the computer system 170, shown in FIG. 1, which can be configured to perform a set of functions as described, including the management of the CDRs stored at the CDR Repository 362 and individual frames of corresponding CDRs stored at the File Repository 324, and the execution of the "drill-down" operation, the "real-time" filtering and matching of calls to specific user defined call criteria for selecting the type of calls that are of interest, and the transportation and notification as per specific user define call criteria and alarms set by the user.

For example, alarm criteria may include: Name of Alarm, Call Record Type, Criteria to match (i.e., logical expressions), Amount of times the criteria must match, Time period to perform the alarm, and Notification methods, such as, email notification, pager, text messaging, Simple Network Management Protocol (SNMP) Trap, or any combination thereof. These are not intended to be a limiting list because different users will want to specify different alarm criteria depending on what aspects of the mobile telephony network 100 that need to be monitored and reviewed. Other input mechanisms are possible such as an editable table, and defaults may be set so that a user does not need to specify all the data for the alarm criteria.

An example alarm can be configured to include the following: (1) Name of Alarm; (2) Call Record Type; (3) Criteria to match (Logical expressions can be used); (4) The amount of times this criteria must match; (5) Time period to perform the alarm. An example of user defined call criteria may be shown in the following Table 1 as follows:

TABLE 1

| Criteria | Value |
| --- | --- |
| Name of Alarm | "Iu" abnormal releases |
| Call Record Type | "Iu" Interface |
| Criteria to match | RANAP Cause = 'Abnormal Release' |

TABLE 1-continued

| Criteria | Value |
| --- | --- |
| The minimum of times this criteria must match | 10 |
| Time period to perform the alarm | 60 seconds |
| Notification | SNMP Trap |

Referring back to the CDR Encapsulator/Decapsulator 340 shown in FIG. 3, the Encoder 342 receives CDR details from the CDR Generator 322 and encodes the CDR details using a set of predefined encoding rules 342B in a XML file format with each file corresponding a field of a packet containing a specific parameter as described in connection with FIG. 2A and FIG. 2B. An example format of one of the fields in the XML file may be as follows:

```
<field position="1">
    <name>Start Date & Time</name>
    <dataID>2003</dataID>
    <type>timestamp</type>
    <length>4</length>
</field>
```

Where <field position="1"> may represent the position in a packet; <name>Start Date & Time</name> may represent the name of the field; <dataID>2003</dataID> may represent an index to be used to extract from memory representation of the CDRs; <type>timestamp</type> may represent the type of element, i.e., timestamp is UTC; and <length>4</length> may represent length of the field in bytes.

In addition, other header information may also be included in the packet. For example:

```
<lore>
    <updated>1</updated>
    <version>2.0</version>
    <profile>DMT 3GPP R5 06-2004 Iu Interface</profile>
    <id>375</id>
</lore>
```

Both the 'version' and 'id' will be encoded into the packet. Once the packet is built, such a packet will then be sent to the Decoder 346, via the Transporter 344. At the receiving end, the same XML files, i.e., decoding rules 346B, will be used to decode the TCP packet.

Example encoding rules 342B and decoding rules 346B may be set with reference to parameters utilized for an "Iu" interface, as shown, for example, in FIG. 2A, as follows:

```
<XML version="1.0" encoding="UTF-8" standalone="no" ?>
- <callflowprotocol>
    - <lore>
        <updated>1</updated>
        <version>2.0</version>
        <profile>DMT 3GPP R5 06-2004 Iu Interface</profile>
        <id>375</id>
    </lore>
    - <dataunit>
        - <field position="1">
            <name>Start Date & Time</name>
            <dataid>2003</dataid>
            <type>timestamp</type>
```

```xml
      <length>4</length>
    </field>
    <field position="2">
      <name>IMSI</name>
      <dataid>1005</dataid>
      <type>string</type>
      <length>32</length>
    </field>
    <field position="3">
      <name>IMEI</name>
      <dataid>1023</dataid>
      <type>string</type>
      <length>32</length>
    </field>
    <field position="4">
      <name>Oldest TMSI/P-TMSI</name>
      <dataid>1007</dataid>
      <type>string</type>
      <length>9</length>
    </field>
    <field position="5">
      <name>Latest TMSI/P-TMSI</name>
      <dataid>1006</dataid>
      <type>string</type>
      <length>9</length>
    </field>
    <field position="6">
      <name>SAI LAC</name>
      <dataid>1020</dataid>
      <type>string</type>
      <length>16</length>
    </field>
    <field position="7">
      <name>SAI SAC</name>
      <dataid>1051</dataid>
      <type>int</type>
      <length>4</length>
    </field>
    <field position="8">
      <name>RAC</name>
      <dataid>1019</dataid>
      <type>int</type>
      <length>4</length>
    </field>
    <field position="9">
      <name>Called Party BCD Number</name>
      <dataid>1003</dataid>
      <type>string</type>
      <length>32</length>
    </field>
    <field position="10">
      <name>Calling Party BCD Number</name>
      <dataid>1004</dataid>
      <type>string</type>
      <length>32</length>
    </field>
    <field position="11">
      <name>CN Domain</name>
      <dataid>1016</dataid>
      <type>int</type>
      <length>4</length>
    </field>
    <field position="12">
      <name>SCCP Release Cause</name>
      <dataid>1008</dataid>
      <type>int</type>
      <length>4</length>
    </field>
    <field position="13">
      <name>RANAP Cause</name>
      <dataid>1018</dataid>
      <type>int</type>
      <length>4</length>
    </field>
    <field position="14">
      <name>Setup Time</name>
      <dataid>1010</dataid>
      <type>duration</type>
      <length>4</length>
    </field>
    </field>
    <field position="15">
      <name>Cleardown Time</name>
      <dataid>1011</dataid>
      <type>duration</type>
      <length>4</length>
    </field>
    <field position="16">
      <name>Speech Path/CID</name>
      <dataid>1017</dataid>
      <type>string</type>
      <length>16</length>
    </field>
    <field position="17">
      <name>Bad Speech Frames</name>
      <dataid>1021</dataid>
      <type>int</type>
      <length>4</length>
    </field>
    <field position="18">
      <name>IPv4 Address</name>
      <dataid>2012</dataid>
      <type>ipaddress</type>
      <length>4</length>
    </field>
    <field position="19">
      <name>Uplink Packets</name>
      <dataid>2015</dataid>
      <type>int</type>
      <length>4</length>
    </field>
    <field position="20">
      <name>Downlink Packets</name>
      <dataid>2016</dataid>
      <type>int</type>
      <length>4</length>
    </field>
    <field position="21">
      <name>Uplink Octets</name>
      <dataid>2017</dataid>
      <type>int</type>
      <length>4</length>
    </field>
    <field position="22">
      <name>Downlink Octets</name>
      <dataid>2018</dataid>
      <type>int</type>
      <length>4</length>
    </field>
    <field position="23">
      <name>Uplink Rate bp/s</name>
      <dataid>2019</dataid>
      <type>int</type>
      <length>4</length>
    </field>
    <field position="24">
      <name>Downlink Rate bp/s</name>
      <dataid>2020</dataid>
      <type>int</type>
      <length>4</length>
    </field>
    <field position="25">
      <name>Uplink__MaxBitrate(CS)</name>
      <dataid>2021</dataid>
      <type>int</type>
      <length>4</length>
    </field>
    <field position="26">
      <name>Downlink__MaxBitrate(CS)</name>
      <dataid>2022</dataid>
      <type>int</type>
      <length>4</length>
    </field>
    <field position="27">
      <name>Uplink__MaxBitrate(PS)</name>
      <dataid>2023</dataid>
      <type>int</type>
      <length>4</length>
    </field>
```

-continued

```xml
<field position="28">
    <name>Downlink_MaxBitrate(PS)</name>
    <dataid>2024</dataid>
    <type>int</type>
    <length>4</length>
</field>
<field position="29">
    <name>CC Cause</name>
    <dataid>1025</dataid>
    <type>int</type>
    <length>4</length>
</field>
<field position="30">
    <name>SM Cause</name>
    <dataid>1026</dataid>
    <type>int</type>
    <length>4</length>
</field>
<field position="31">
    <name>RR Cause</name>
    <dataid>1027</dataid>
    <type>int</type>
    <length>4</length>
</field>
<field position="32">
    <name>GMM Cause</name>
    <dataid>1028</dataid>
    <type>int</type>
    <length>4</length>
</field>
<field position="33">
    <name>MM Cause</name>
    <dataid>1029</dataid>
    <type>int</type>
    <length>4</length>
</field>
<field position="34">
    <name>APN</name>
    <dataid>1030</dataid>
    <type>string</type>
    <length>64</length>
</field>
<field position="35">
    <name>Relocation Cause</name>
    <dataid>3001</dataid>
    <type>int</type>
    <length>4</length>
</field>
<field position="36">
    <name>Iu ALCAP Cause</name>
    <dataid>3002</dataid>
    <type>int</type>
    <length>4</length>
</field>
<field position="37">
    <name>ARP (CS)</name>
    <dataid>3003</dataid>
    <type>int</type>
    <length>4</length>
</field>
<field position="38">
    <name>ARP (PS)</name>
    <dataid>4032</dataid>
    <type>int</type>
    <length>4</length>
</field>
<field position="39">
    <name>Authentication and Ciphering Cause</name>
    <dataid>3004</dataid>
    <type>int</type>
    <length>4</length>
</field>
<field position="40">
    <name>DL Guaranteed Bitrate(CS)</name>
    <dataid>3005</dataid>
    <type>int</type>
    <length>4</length>
</field>
<field position="41">
    <name>UL Guaranteed Bitrate(CS)</name>
    <dataid>4052</dataid>
    <type>int</type>
    <length>4</length>
</field>
<field position="42">
    <name>DL Guaranteed Bitrate(PS)</name>
    <dataid>4053</dataid>
    <type>int</type>
    <length>4</length>
</field>
<field position="43">
    <name>UL Guaranteed Bitrate(PS)</name>
    <dataid>4054</dataid>
    <type>int</type>
    <length>4</length>
</field>
<field position="44">
    <name>Security Mode Cause</name>
    <dataid>3007</dataid>
    <type>int</type>
    <length>4</length>
</field>
<field position="45">
    <name>THP (CS)</name>
    <dataid>3008</dataid>
    <type>int</type>
    <length>4</length>
</field>
<field position="46">
    <name>THP (PS)</name>
    <dataid>4002</dataid>
    <type>int</type>
    <length>4</length>
</field>
<field position="47">
    <name>Transfer Delay (CS)</name>
    <dataid>3009</dataid>
    <type>int</type>
    <length>4</length>
</field>
<field position="48">
    <name>Transfer Delay (PS)</name>
    <dataid>4082</dataid>
    <type>int</type>
    <length>4</length>
</field>
<field position="49">
    <name>Old LAC</name>
    <dataid>3010</dataid>
    <type>int</type>
    <length>4</length>
</field>
<field position="50">
    <name>LUT</name>
    <dataid>3011</dataid>
    <type>int</type>
    <length>4</length>
</field>
<field position="51">
    <name>Old RAC</name>
    <dataid>3012</dataid>
    <type>int</type>
    <length>4</length>
</field>
<field position="52">
    <name>RUT</name>
    <dataid>3013</dataid>
    <type>int</type>
    <length>4</length>
</field>
<field position="53">
    <name>GMM Attach Type</name>
    <dataid>3014</dataid>
    <type>int</type>
    <length>4</length>
</field>
<field position="54">
    <name>CP Cause</name>
```

```xml
            <dataid>3015</dataid>
            <type>int</type>
            <length>4</length>
        </field>
        <field position="55">
            <name>RP Cause</name>
            <dataid>4152</dataid>
            <type>int</type>
            <length>4</length>
        </field>
        <field position="56">
            <name>TP Cause</name>
            <dataid>4153</dataid>
            <type>int</type>
            <length>4</length>
        </field>
        <field position="57">
            <name>No of Act PDP Ctxt Accept</name>
            <dataid>3016</dataid>
            <type>int</type>
            <length>4</length>
        </field>
        <field position="58">
            <name>No of Act PDP Ctxt Req</name>
            <dataid>3017</dataid>
            <type>int</type>
            <length>4</length>
        </field>
        <field position="59">
            <name>No of RP-ACK (MS)</name>
            <dataid>3018</dataid>
            <type>int</type>
            <length>4</length>
        </field>
        <field position="60">
            <name>No of RP-ACK (NW)</name>
            <dataid>4182</dataid>
            <type>int</type>
            <length>4</length>
        </field>
        <field position="61">
            <name>No of CM Service Req (SMS)</name>
            <dataid>3019</dataid>
            <type>int</type>
            <length>4</length>
        </field>
        <field position="62">
            <name>No of Iu Rel Req (dropped)</name>
            <dataid>3020</dataid>
            <type>int</type>
            <length>4</length>
        </field>
        <field position="63">
            <name>No of Alerting</name>
            <dataid>3021</dataid>
            <type>int</type>
            <length>4</length>
        </field>
        <field position="64">
            <name>No of CM Service Req(MOC)</name>
            <dataid>3022</dataid>
            <type>int</type>
            <length>4</length>
        </field>
        <field position="65">
            <name>CM Service Setup Time</name>
            <dataid>3023</dataid>
            <type>duration</type>
            <length>4</length>
        </field>
        <field position="66">
            <name>GMM Attach Setup Time</name>
            <dataid>4232</dataid>
            <type>duration</type>
            <length>4</length>
        </field>
        <field position="67">
            <name>PDP Ctxt Setup Time</name>
            <dataid>3024</dataid>
            <type>duration</type>
            <length>4</length>
        </field>
        <field position="68">
            <name>Service Type</name>
            <dataid>3037</dataid>
            <type>string</type>
            <length>128</length>
        </field>
        <field position="69">
            <name>UTRAN PC</name>
            <dataid>3046</dataid>
            <type>int</type>
            <length>4</length>
        </field>
    </dataunit>
</callflowprotocol>
```

Returning now to FIG. 3, upon determining that the call associated with currently generated data records such as the CDRs is complete, the Encoder 342 encodes the CDRs using the encoding rules 342B as described above, for transportation, via the Transporter 344, to the Decoder 346 for decoding using the decoding rules 346B (i.e., the same as the encoding rules 342B) and the CDR Gateway 348 so as to be stored in the CDR Repository 352 and/or to be provided to the user through the Notification Engine 358. The Transporter 230 may also transport the encoded CDRs to another point in the network provided with an IP address, or a similar destination addressing method.

The CDR production unit 320, the CDR Encapsulator/Decapsulator unit 340 and the user input 360 can be software modules written in XML languages. However, such modules can also be written in a variety of software languages, including C, C++, Java, Visual Basic, J2EE, SQL, Perl, Web Services, VB.NET and many other languages over the Internet. The various software modules may also be integrated in a single application executed on one or more control units (not shown), such as a microprocessor, a microcontroller, or a processor card (including one or more microprocessors or microcontrollers) in the computer system 170, for example, as shown in FIG. 1. Alternatively, the software modules and individual components of each module can also be distributed in different applications executed by different computing systems, such as the monitoring system 160, the computer system 170, or any other computing devices connected to the mobile telephony network 100. For example, the CDR Production unit 320 may reside on the monitoring system 160, as shown in FIG. 1. The CDR Encapsulator/Decapsulator unit 340 may reside on the computer system 170. Alternatively, individual component of the CDR Encapsulator/Decapsulator unit 340 can reside in the monitoring system 160 or the computer system 170. For example, the Encoder 342 and Transporter 344 of the CDR Encapsulator/Decapsulator 340 can reside in the computer system 170, while the Decoder 346, the CDR Gateway 348, the Storage Engine 350 and the Notification Engine 354 can reside in the monitoring system 160. Similarly, the user input 360 may reside on the same computer system 170, or alternatively, another computing device, such as an external PC, a laptop, or a server coupled to a local area network (LAN). Alternatively, components of the CDR production unit 320, the CDR Encapsulator/Decapsulator 340 and the user input 340 can also be integrated in a single application which can be installed at a single computing device, such as the computer system 170, as shown in FIG. 1.

These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs).

Instructions of the software routines or modules may also be loaded or transported into the monitoring system 160, the computer system 170 or any computing devices on the mobile telephony network 100 in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

Figure 4:
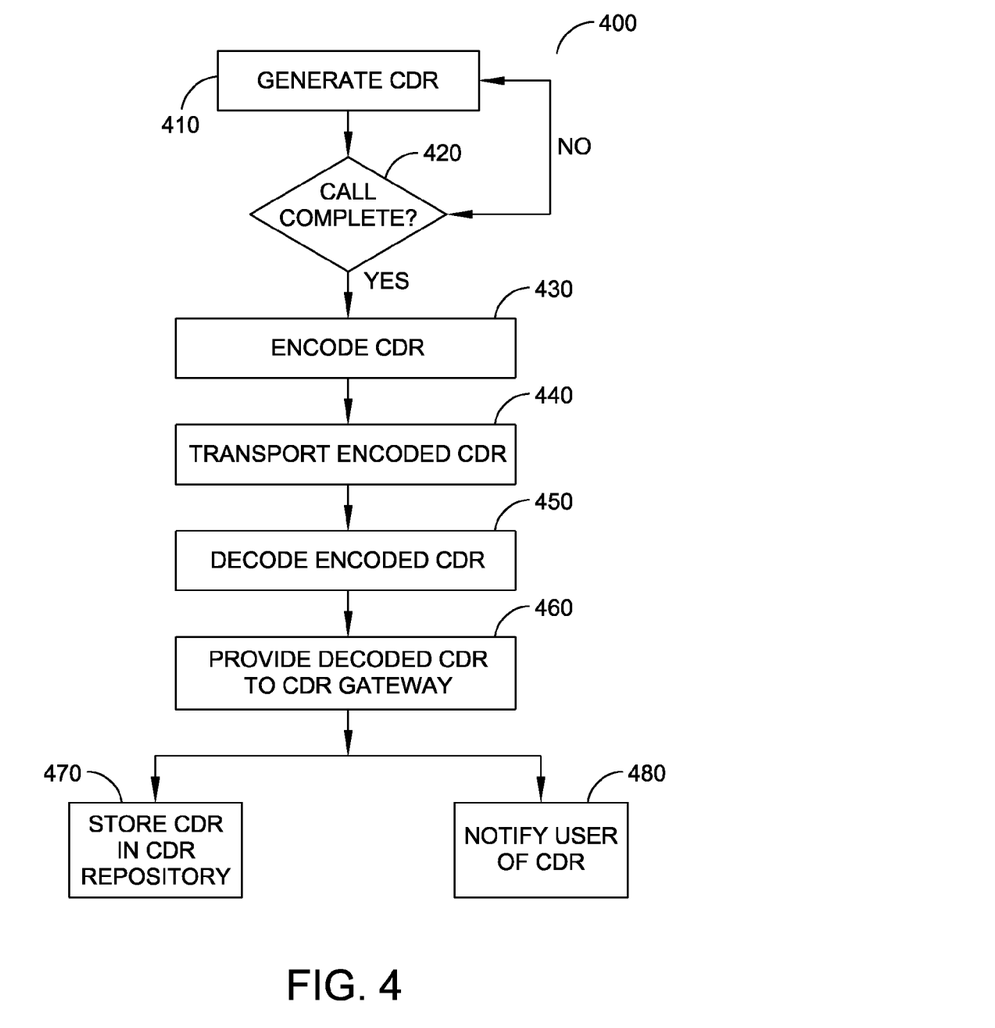
FIG. 4 illustrates a flowchart of an example operation of the data record package and transportation system according to an embodiment of the present invention.

FIG. 4 illustrates an example "real-time" operation of the data record package and transportation system according to an embodiment of the present invention. In operation 410, the CDR Generator 322 receives an incoming data stream from one or more monitoring points within the mobile telephony network 100 and generates CDRs from the data stream. In operation 420, the Encoder 342 determines if a call for which a CDR is being generated is complete. If the call for which the CDR is being generated is not complete, operation 410 is continued until the call is complete. If the call for which the CDR is being generated is in fact complete, the CDR is then encoded by the Encoder 342 using the encoding rules 342 as described previously, for transportation, via a network channel, in operation 430. In operation 440, the encoded CDR is packaged in a TCP stream of packets and transported, via the Transporter 344. In operation 450, the encoded CDR is received and decoded by the Decoder according to decoding rules (i.e., the same set of rules for encoding operation). In operation 460, the decoded CDR is provided to the CDR Gateway 348 where the CDR Gateway 250 simultaneously provides the decoded CDRs to the Storage Engine 350 and the Notification Engine 354. In operation 470, the Storage Engine 260 stores the decoded CDRs in the CDR Repository 352, while simultaneously the Notification Engine 354 notifies the user of the decoded CDR which may be viewed by the user. The Notification Engine 354 notifies the user of the decoded CDR according to notification rules provided received from a user, system, or other, or provided in the Notification Engine 354.

As described from the foregoing, the present invention advantageously provides the user (i.e., network administrator or maintenance personnel) with improved tools, systems, and methods for the management and analysis of detail records in such a mobile telephony network, including the ability to generate, store, and provide to a user, in real time, CDRs to provide a high level view of the health of the mobile telephony network. By viewing these CDRs immediately upon completion of the related calls, the user is able to immediately identify problems in the network and take corrective action to prevent further problems, without having to wait for a period in which many CDRs are stored en masse in the system.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. Many modifications, permutations, additions, and sub-combinations may be made to adapt the teachings of the present invention to a particular situation without departing from the scope thereof. In addition, while the mobile network has been described in the context of a telecommunications network having an architecture typical of North America and employing the SS7 protocol, it should be appreciated that the present invention is not limited to this particular telecommunications network or protocol. Rather, the invention is applicable to other communications networks and compatible signalling protocols, for example an Integrated Systems Digital Network (ISDN), a Voice over IP (VoIP) network, the Internet, or a cellular communications system, such as a Global System for Mobile communications (GSM) network or a Universal Mobile Telecommunications System (UMTS) network. Moreover, alternative embodiments of the invention can be implemented as a computer program product for use with a computer system. Such a computer program product can be, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device. Lastly, the CDR Repository can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Accordingly, it is intended, therefore, that the present invention not be limited to the various example embodiments disclosed, but that the present invention includes all embodiments falling within the scope of the appended claims.

What is claimed is:

1. A system to monitor a mobile network, comprising: a data record generator arranged to receive, on a real-time basis, a data stream representing calls occurring on the mobile network, and to generate a call detail record (CDR) corresponding of a single call; and an encapsulator/decapsulator unit arranged to encapsulate the CDR in a network transport protocol immediately when the single call is terminated, and transport the same to a CDR repository for storage and/or immediate action by a user, via a user input.

2. The system as claimed in claim 1, wherein the encapsulator/decapsulator unit comprises: an encoder which receives and encodes the CDR according to predefined encoding rules, when the single call is terminated; a transporter which encapsulates the encoded CDR in packet form and generates a stream of packets using the network transport protocol; a decoder which decodes the packets using predefined decoding rules to obtain the original CDR; and a CDR gateway which serves as a gateway for forwarding the CDR to a storage engine where the CDR can be immediately stored in a CDR Repository.

3. The system as claimed in claim 2, wherein the CDR gateway also simultaneously forwards the CDR to a notification engine where immediate user notification can be generated in real-time, in response to predefined notification rules.

4. The system as claimed in claim 3, wherein the user input corresponds to a graphical user interface (GUI) which accepts inputs from the user to set the user defined call criteria for retrieval of one or more CDRs associated with a particular call from the CDR repository for initial signaling analysis and to request retrieval of detailed frame messages corresponding to one or more selected CDRs for detailed signaling analysis.

5. The system as claimed in claim 3, wherein the immediate user notification can be generated by way of email notification, pager, text messaging, Simple Network Management Protocol trap, or any combination thereof.

6. The system as claimed in claim 2, wherein the predefined encoding rules correspond to the predefined decoding rules written in a XML file format with each file representing a field of a packet containing a specific parameter of the single call obtained from the mobile network.

7. The system as claimed in claim 2, wherein the encapsulator/decapsulator unit is also configured to retrieve one or more CDRs from the CDR repository associated with a particular call ID for a visual display, upon request from the user input, and to receive a request from the user input to perform a "drill-down" operation in which one or more CDRs that make up the selected call can be drilled down for signaling analysis, or details of individual frames corresponding to selected CDRs that make up the selected call can be drilled down for a visual display for detailed signaling analysis.

8. The system as claimed in claim 7, wherein the user input comprises a graphical user interface, and the user determines a method in which the notification unit notifies the user that the detail record is available to be viewed, via the user input.

9. A method of monitoring a mobile network, comprising: receiving a data stream from one or more monitoring points of the mobile network and generating a detail record of a single call occurring on the mobile network; encapsulating the detail record in a network transport protocol immediately when the single call is terminated; and transporting an encapsulating detail record to be stored in a central repository for storage and/or immediate action by a user, via a user input.

10. The method as claimed in claim 9, wherein the detail record is encapsulated by encoding the detail record using predefined encoding rules.

11. The method as claimed in claim 10, further comprising: receiving and decoding an encoded detail record in a stream of packets using defined decoding rules to obtain the original detail record; and forwarding the CDR to a storage engine where the CDR can be immediately stored in a CDR Repository, and/or to a notification engine where immediate user notifications can be generated in real-time, in response to predefined notification rules.

12. The method as claimed in claim 11, wherein the notifying the user that the detail record is available to be viewed, via the user input, comprises notifying the user by way of email notification, pager, text messaging, Simple Network Management Protocol (SNMP) trap, or any combination thereof.

13. The method as claimed in claim 12, wherein the user input comprises a graphical user interface, and the user determines a method in which the notification unit notifies the user that the detail record is available to be viewed, via the user input.

14. The method as claimed in claim 9, wherein the user input corresponds to a graphical user interface (GUI) which accepts inputs from the user to set the user defined call criteria for retrieval of one or more CDRs associated with a particular call from the CDR repository for initial signaling analysis and to request retrieval of detailed frame messages corresponding to one or more selected CDRs for detailed signaling analysis.

15. The method as claimed in claim 9, wherein the user input comprises a graphical user interface (GUI), and the user determines a method in which the notification unit notifies the user that the detail record is available to be viewed, via the GUI.

16. A computer readable medium encoded with processing instructions to perform a method of monitoring a mobile network, the method comprising: receiving a data stream from one or more monitoring points of the mobile network and generating a detail record of a single call occurring on the mobile network; encapsulating the detail record in a network transport protocol immediately when the single call is terminated; and transporting an encapsulating detail record to be stored in a central repository for storage and/or immediate action by a user, via a user input.

17. The computer readable medium as claimed in claim 16, further comprising: receiving and decoding an encoded detail record in a stream of packets using defined decoding rules to obtain the original detail record; and forwarding the CDR to a storage engine where the CDR can be immediately stored in a CDR Repository, and/or to a notification engine where immediate user notifications can be generated in real-time, in response to predefined notification rules.

18. The computer readable medium as claimed in claim 16, wherein the storing the generated detail record in the data record storage unit, and the notifying the user that the detail record is available to be viewed, comprises receiving the detail record at a data record gateway which then stores the detail record and notifies the user.

19. The computer readable medium as claimed in claim 18, the user input corresponds to a graphical user interface (GUI) which accepts inputs from the user to set the user defined call criteria for retrieval of one or more CDRs associated with a particular call from the CDR repository for initial signaling analysis and to request retrieval of detailed frame messages corresponding to one or more selected CDRs for detailed signaling analysis.

20. The computer readable medium as claimed in claim 16, wherein the notifying the user that the detail record is available to be viewed, via the user input, comprises notifying the user by way of email notification, pager, text messaging, Simple Network Management Protocol (SNMP) trap, or any combination thereof.

21. The computer readable medium as claimed in claim 16, the user input comprises a graphical user interface (GUI), and the user determines a method in which the notification unit notifies the user that the detail record is available to be viewed, via the GUI.

* * * * *